(12) United States Patent
Ohki

(10) Patent No.: US 6,429,886 B2
(45) Date of Patent: *Aug. 6, 2002

(54) CORRECTION CONTROL FOR IMAGE FORMING APPARATUS AND METHOD

(75) Inventor: Makoto Ohki, Mishima (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 31 days.

(21) Appl. No.: 09/443,718

(22) Filed: Nov. 19, 1999

(30) Foreign Application Priority Data

Nov. 20, 1998 (JP) ............................................ 10-331721

(51) Int. Cl.[7] ........................ B41J 2/385; G01D 15/06; G03G 15/01
(52) U.S. Cl. ........................ 347/115; 347/232; 399/38; 399/39
(58) Field of Search ................................. 347/115, 116, 347/132, 133, 232; 399/38, 39, 40, 46, 49, 301

(56) References Cited

U.S. PATENT DOCUMENTS

| 4,935,787 A | * | 6/1990 | Maeda et al. .................. 399/39 |
| 5,023,662 A | * | 6/1991 | Kusumoto et al. ............ 399/39 |
| 5,210,576 A | * | 5/1993 | Haneda et al. ................. 399/39 |
| 5,343,282 A | * | 8/1994 | Kazaki et al. ................. 399/39 |
| 5,373,355 A | * | 12/1994 | Ando et al. .................. 399/301 |
| 5,740,492 A | * | 4/1998 | Deki et al. .............. 399/301 X |
| 5,950,036 A | | 9/1999 | Konishi .......................... 399/8 |
| 5,963,756 A | * | 10/1999 | Sakai et al. .................... 399/39 |

\* cited by examiner

*Primary Examiner*—Sandra Brase
(74) *Attorney, Agent, or Firm*—Fitzpatrick, Cella, Harper & Scinto

(57) ABSTRACT

An image processing apparatus capable of color image formation with a plurality of color components, which solves a problem of increment of processing time in monochrome image formation due to correction on image formation conditions with predetermined patch formation. For this purpose, in case of monochrome image formation, even if a tonality control request flag is set, an image formation sequence is started without performing tonality control. Thus processing time can be reduced in monochrome image formation.

16 Claims, 10 Drawing Sheets

CORRECTION CONTROL FOR IMAGE FORMING APPARATUS AND METHOD

BACKGROUND OF THE INVENTION

1. Field of the Invention

The present invention relates to an image processing apparatus, an image processing method and a recording medium, and more particularly, to an image processing apparatus, an image processing method and a recording medium for color image formation with a plurality of color components.

2. Description of Related Art

Generally, a color image formation processing apparatus such as a color copier, a color printer or the like, for color image formation by using an electrophotographic printing method and the like, performs specific control which is not performed in a monochrome copier or printer.

Generally, to form a full color image in the color image formation apparatus, yellow (Y), magenta (M), cyan (C) and black (K) color plane are formed, and the respective planes are finally overlaid on a print sheet as a transfer material. The quality of formed image greatly varies depending on the color balance and relative positional precision of each plane.

Accordingly, in the electrophotographic color image formation apparatus, various controls are performed to constantly obtain image quality at a predetermined level. For example, feedforward control is performed to preset a development contrast potential based on the environmental information such as external temperature/humidity for obtaining an optimum development characteristic, or feedback control is performed to actually form a development toner image (hereinafter referred to as a "patch") on an electrostatic drum or the like, then perform self-diagnostics on the developing characteristic by detecting the density of the toner image, and feed back the diagnosis to tonality control parameters. Such control improves the quality of formed image.

However, upon feedback control by self-diagnostics as described above, as the settings of the various tonality control parameters are changed by actually forming a patch or the like and detecting it, a predetermined period of processing time is required.

Further, as the feedback control is most effective when it is performed immediately before actual image formation, the feedback control is performed upon occurrence of an image formation start signal such as a copy start signal, and an actual image formation sequence such as copying is performed after the completion of the feedback control. However, if the feedback control is always performed immediately before the image formation sequence, a fast copy time (FCOT) as a period between the depression of a copy key to the discharge of a copy image is prolonged.

Accordingly, in the conventional color image formation apparatus, to minimize the necessary number of execution of feedback control, the following limitation is posed to the execution of feedback control. For example, in a case where the number of output images exceeds a preset number of pages, or the surrounding environment such as temperature/humidity changes to a value equal to a predetermined value or greater, otherwise, in a case where image output has not been performed for a predetermined period or longer, an execution request indicative of execution of feedback control is issued. Only if the execution request is issued, the feedback control by self-diagnostics is performed.

However, the above conventional color image formation apparatus has the following problem.

As described above, the color image formation apparatus having a plurality of developing units can form and output a monochrome image such as a black-and-white image. However, as the feedback control by self-diagnostics is also performed in monochrome image formation, the FCOT is greatly prolonged even in monochrome image copy output. As the operability is greatly degraded, the color image formation apparatus cannot be satisfactorily used in a monochrome image formation.

SUMMARY OF THE INVENTION

The present invention has been made to solve the above problem, and has its object to provide an image processing apparatus capable of color image formation, an image processing method and a recording medium, which reduce processing time in monochrome image output.

According to one aspect of the present invention, the foregoing object is attained by providing an image processing apparatus for forming a color image with a plurality of color components, comprising: input means for inputting image data; image formation means for performing image formation based on the image data; correction means for correcting image formation conditions in the image formation means; and control means for avoiding correction by the correction means if monochrome image formation is performed by the image formation means.

Further, the correction means further comprises: pattern formation means for forming a predetermined pattern by the image formation means; and detection means for detecting pattern information of the pattern, and the correction means corrects the image formation conditions based on the pattern information detected by the detection means.

For example, the correction means forms a predetermined tonality pattern for each color by the pattern formation means, and detects a density of the tonality pattern by the detection means. At that time, the correction means corrects a color balance by generating a look-up table to perform tonality correction for each color based on the density of the tonality pattern detected by the detection means.

For example, the correction means forms a predetermined pattern in a predetermined position for each color by the pattern formation means, and detects a formation position of the pattern by the detection means. At that time, the correction means corrects an image formation position for each color based on the formation position of the pattern detected by the detection means.

Further, another object of the present invention is to provide a printer driver having a novel function.

According to another aspect of the present invention, the foregoing object is attained by providing a recording medium containing a control program capable of forming a color image with a plurality of color components, wherein the control program including: code of determination process for determining whether or not an object job relates to monochrome image formation; and code of control process for avoiding execution of apparatus optimization processing in an image formation apparatus to perform the job, if it is determined as a result of determination at the determination process that the job relates to the monochrome image formation.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<First Embodiment>

Figure 1:
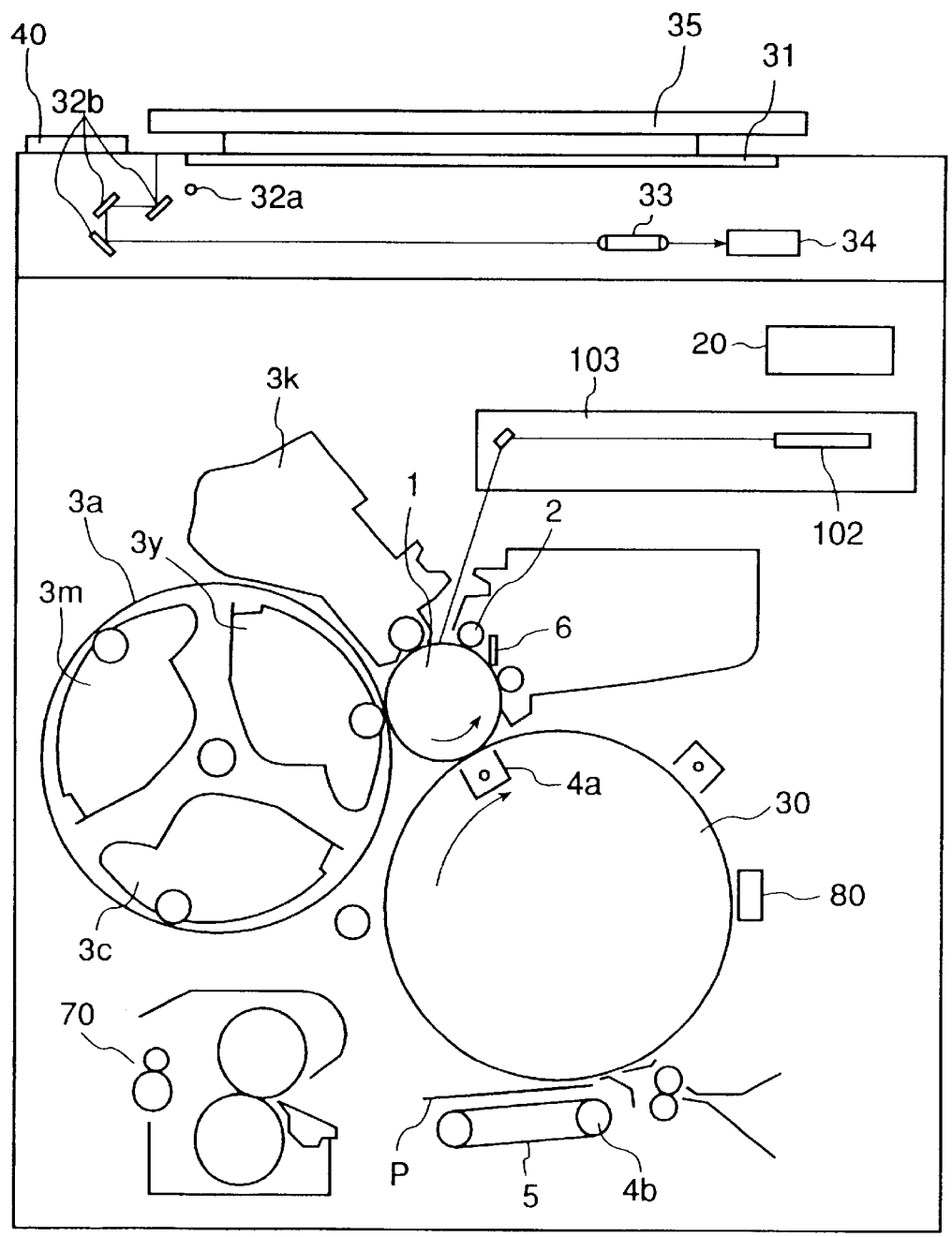
FIG. 1 is a schematic cross sectional view of an image formation apparatus according to a first embodiment of the present invention.

FIG. 1 is a schematic cross sectional view showing the structure of an image formation apparatus according to a first embodiment of the present invention. The image formation apparatus performs full-color image formation by an electrophotographic method based on an image signal obtained by reading an original.

At an operation unit 40, when a copy key (not shown) is depressed, an original 35 placed on a glass plate 31 is irradiated with light outputted from an exposure lamp 32a. Then light reflected from the original 35 is guided by a plurality of mirrors 32b and a lens 33, and forms an image on a full color sensor 34 having a 3-line CCD.

The full color sensor 34 comprises CCD line sensors of red (R), green (G) and blue (B) colors arranged a predetermined distance away from each other in a subscanning direction. Each line sensor has an array of photoreceptors. The full color sensor 34 separates the reflection light image entered from the original 35 into a plurality of pixels by using a plurality of photoelectric transducers, and generates photoelectric conversion signals (color separation image signals) in accordance with the densities of the respective pixels.

The RGB image signals generated by the full color sensor 34 are sent to an image processing unit 20, then subjected to image processing such as tonality correction to be described later and PWM, and sent, as an image signal comprising magenta (M), cyan (C), yellow (Y) and black (K) color components, to an exposure device 103.

Reference numeral 1 denotes an image holder i.e., an electrostatic drum which rotates in an arrow direction in FIG. 1. Image formation means is arranged around the electrostatic drum. The image formation means may have an arbitrary construction, however, in this embodiment, has a primary charger 2 to uniformly charge the surface of the electrostatic drum 1, the exposure device 103 to expose the electrostatic drum 1 and form electrostatic latent images, a rotary developer 3a to develop the electrostatic latent images on the electrostatic drum into visible Y, M and C color toner images, and a fixed developer 3k containing a K color developing agent.

The exposure device 103 has a laser driver 102 to control laser beam emission by a semiconductor laser. The exposure device 103 forms electrostatic latent images on the electrostatic drum 1 by irradiating the electrostatic drum with optical images obtained by color-separating a color image or images corresponding to the optical images.

The rotary developer 3a holds three developers 3y, 3m and 3c respectively containing a Y color developing agent, an M color developing agent and a C color developing agent, around the rotatably-supported approximately cylindrical body of the rotary developer 3a. When the body of the rotary developer 3a rotates, a developer, containing a developing agent of a color corresponding to an electrostatic latent image on the electrostatic drum 1, is conveyed to a developing position opposite to the periphery of the electrostatic drum 1, to develop the electrostatic latent image, thus visualizing the latent image as a toner image. Similarly, an electrostatic latent image corresponding to the K color is developed by the fixed developer 3k and is visualized.

Note that the image formation apparatus of the present embodiment also performs monochrome image formation by using only the fixed developer 3k as well as color image formation using the rotary developer 3a and the fixed developer 3k.

The toner image formed on the electrostatic drum 1 is transferred onto an intermediate drum 30 by a transfer charger 4a in a position opposite to the electrostatic drum 1 via the intermediate drum 30. This operation is repeated for the other colors. Thus a full color image of 4 color components is formed on the intermediate drum 30.

On the other hand, a print sheet (transfer material) P fed from a paper feeder (not shown) is electrostatically attracted to a transfer material holding belt 5. The full color image formed on the intermediate drum 30 is transferred onto the print sheet P by a transfer charger 4b, and color-mixture fixed onto the print sheet P by a fixer 70. The print sheet is discharged to the outside the apparatus.

Numeral 6 denotes a cleaner to clean residual toner on the electrostatic drum 1.

Note that numeral 80 denotes a reflective type optical sensor (hereinafter referred to as a "density sensor") to detect the density of a patch pattern formed on the intermediate drum 30.

Figure 2:
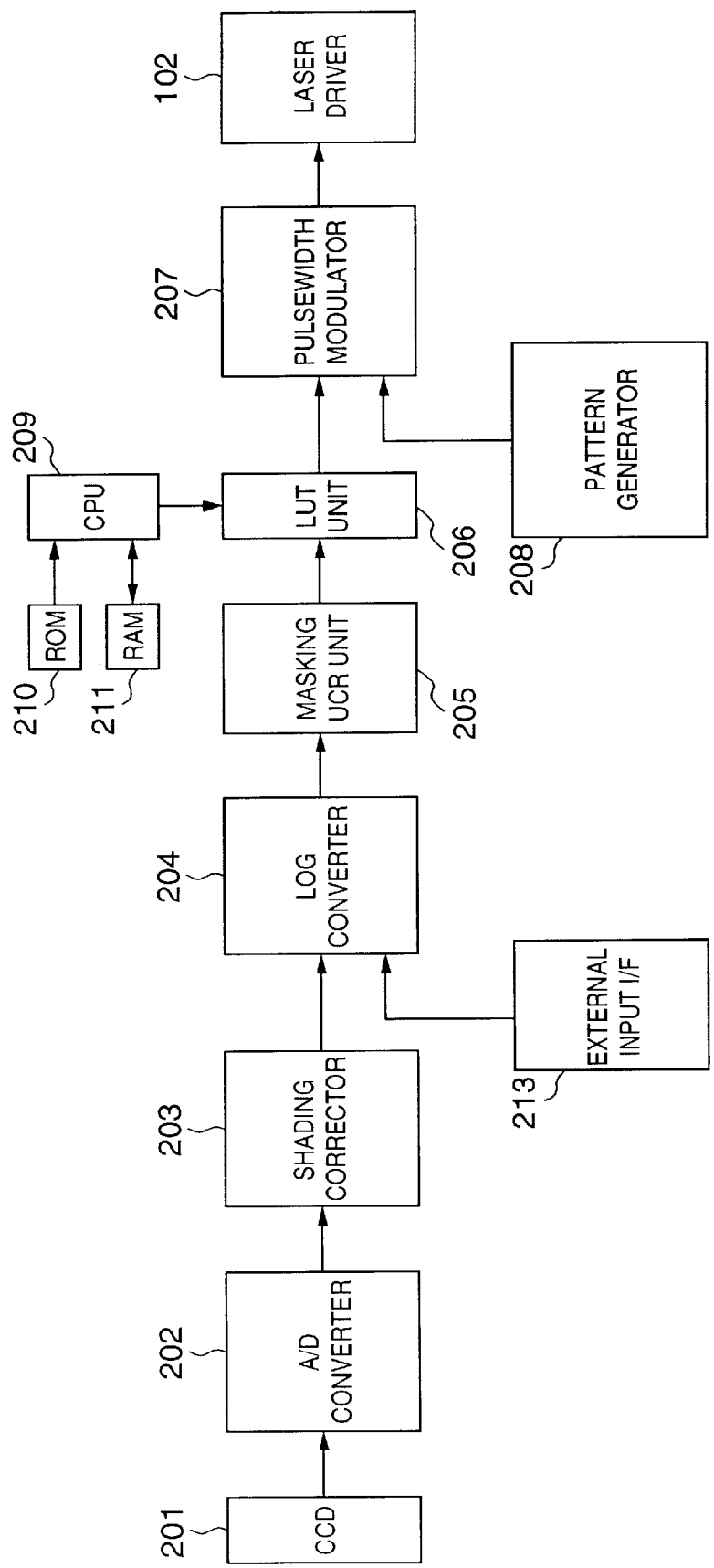
FIG. 2 is a block diagram showing the construction of an image processing unit 20 of the first embodiment.

FIG. 2 is a block diagram showing the construction of the image processing unit 20.

The RGB image signals outputted from the full color sensor 34 are converted by an A/D converter 202 for respective color components into, e.g., 8-bit (0–255 level: 256 levels) RGB digital signals. The RGB digital signals are inputted into a shading corrector 203. To remove variation in sensitivities of the respective photoreceptors arrayed in the full color sensor 34, general shading correction is performed on the RGB digital signals to optimize the gain in correspondence with the respective photoreceptors.

Note that computer-generated (monochrome or color) image data displayed on, e.g., a CRT display, is inputted from an external device (not shown) such as a computer via an external input interface 213 in accordance with necessity.

A LOG converter 204, having a look-up table (LUT) comprising a ROM or the like, converts the input RGB luminance signals into CMY density signals.

A masking UCR unit 205 extracts a black component signal K from the CMY image signals, and performs matrix calculation on the CMYK image signals to correct color mixture in printing color materials in a printer. Further, the masking UCR unit 205 outputs the 8-bit M, C, Y and K color component plane-sequential image signals upon each reading operation of a reader. Note that matrix coefficients used in the matrix calculation are set by a CPU 209.

An LUT unit 206 performs density correction on the input CYMK image signals for respective color components by using a gamma look-up table (γ-LUT) so as to adjust the image signals to an ideal tonality characteristic of the printer. Note that the γ-LUT comprises a RAM or the like, and the contents of the γ-LUT are set by the CPU 209.

A pulsewidth modulator (PWM) 207 outputs pulse signals having pulsewidths corresponding to the levels of the image signals inputted from the LUT unit 206. As described above, the pulse signals are inputted into the laser driver 102 to drive the semiconductor laser, in the exposure device 103.

Numeral 208 denotes a pattern generator holding predetermined patch pattern information for density correction in the present embodiment. The pattern generator 208 directly outputs the information to the PWM 207 for patch detection processing to be described later.

Note that numeral 210 denotes a ROM holding a control program described later with reference to the flowcharts. The control program is read onto a RAM 211 and executed by the CPU 209. The RAM 211 serves as a work area for the CPU 209.

In the present embodiment, as tonality control to maintain the quality of formed full color image, especially tint and gradation, a plurality of predetermined patch patterns are generated for the respective CMYK colors on the intermediate drum, and the γ-LUT in the LUT unit 206 is generated based on density values detected by the density sensor 80.

Figure 3:
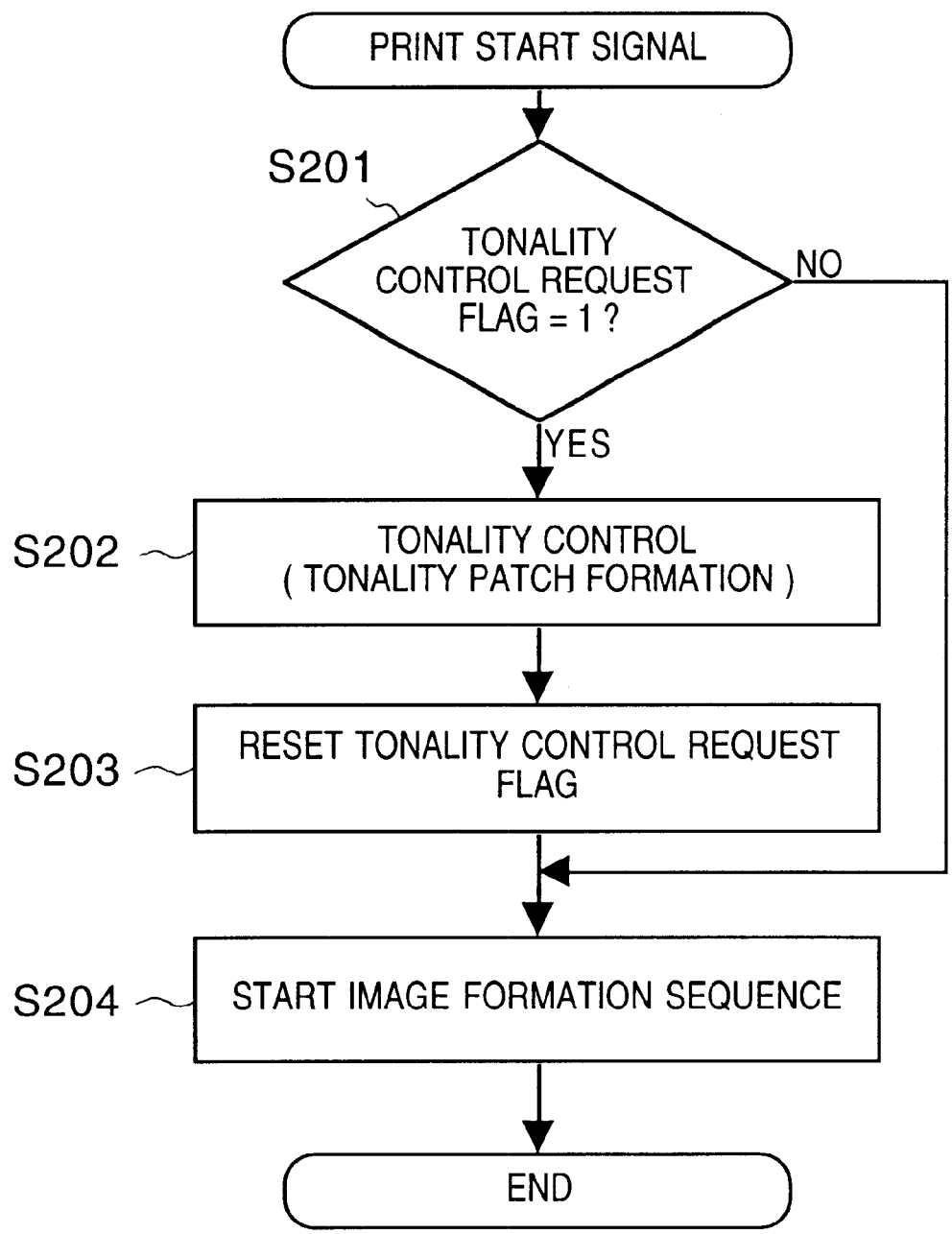
FIG. 3 is a flowchart showing tonality control according to the first embodiment.

FIG. 3 is a flowchart showing patch formation control for controlling formation of tonality patch upon color image formation or monochrome image formation.

First, when the copy key or the like is depressed at the operation unit 40 and a print start signal is inputted at arbitrary timing, then the CPU 209 receives the signal, and determines whether or not a flag (tonality control request flag) is set at a tonality control request address ensured on the RAM 211, i.e., whether or not the value of the flag is "1" (step S201).

If the value of the flag is "1", the CPU 209 issues a tonality control execution request signal, and executes tonality control (step S202). Then, the tonality control request flag is reset (set S203) and then an image formation sequence is performed (step S204).

On the other hand, if the value of the tonality control request flag is "0", the image formation sequence is performed (step S204) without execution of the tonality control, and image output is performed.

In the present embodiment, if any of the following conditions is satisfied, the value of the tonality control request flag becomes "1", i.e., the tonality control execution request is issued.

a. the number of pages of output images after previous control is over 200 b. the ambient temperature has changed by 7 degrees or more, and the ambient humidity has changed by 15% or more c. image output has not been performed for 1 hour or longer Note that variables based on these conditions (the number of output pages, the ambient temperature/humidity, the elapsed time and the like) and the tonality control execution request are reset (step S203) after the execution of tonality control at step S202.

In the present embodiment, the tonality patches formed on the intermediate drum 30 are 8 patches based on predetermined image signal level (0–255 level). The respective color patches are sequentially transferred onto the intermediate drum 30. When the final color patch has been transferred, the density sensor 80 detects the densities of the respective patches. Note that the output voltage of the density sensor 80 ranges from 0 to 5 V. The output voltage is A/D converted to represent the density range 0–2.0 by 10 bits (0–1023 level).

By generating γ-LUTs for the respective colors based on the obtained density information, desired density tonality characteristics can be maintained for the respective colors. Accordingly, in case of color mixture, excellent color balance can be maintained.

Note that the processing speed of the image formation apparatus of the present embodiment is 117 mm/sec. The diameter of the electrostatic drum 1 is 62 mm, and that of the intermediate drum is 186 mm.

In the present embodiment, to form the tonality patches on the intermediate drum 30, first, the intermediate drum 1 is rotated once to perform stabilization processing on the electrostatic drum 1 and the intermediate drum 30. Then, to perform actual tonality patch formation for 4 colors and density measurement, the intermediate drum 30 is rotated 5 times. Further, to perform postprocessing such as cleaning on the electrostatic drum 1 and the intermediate drum 30, the intermediate drum 30 is rotated once. In this manner, to form the tonality patches, the intermediate drum 30 must be rotated 7 times, and it takes about 35 sec to complete this rotation control.

In the image formation apparatus of the present embodiment, image formation using, e.g., black color, i.e., black-and-white copying is possible. Generally, the FCOT (elapsed time from the depression of the copy key to the discharge of copy image) in black-and-white copying is about 14 sec. Accordingly, if the above-described tonality control (S202) is performed in black-and-white copying, the FCOT is about 50 sec, almost 4 times of that in normal copying. In comparison with the FCOT in normal color copying which is about 30 sec, the FOCT is nearly twice. That is, in black-and-white copying characterized by FOCT shorter than that in color copying, the operability is very poor.

In the present embodiment, upon depression of the copy key, the execution of tonality control is controlled in accordance with color image formation or monochrome image formation, to maintain a short FCOT in monochrome image formation.

Figure 4:
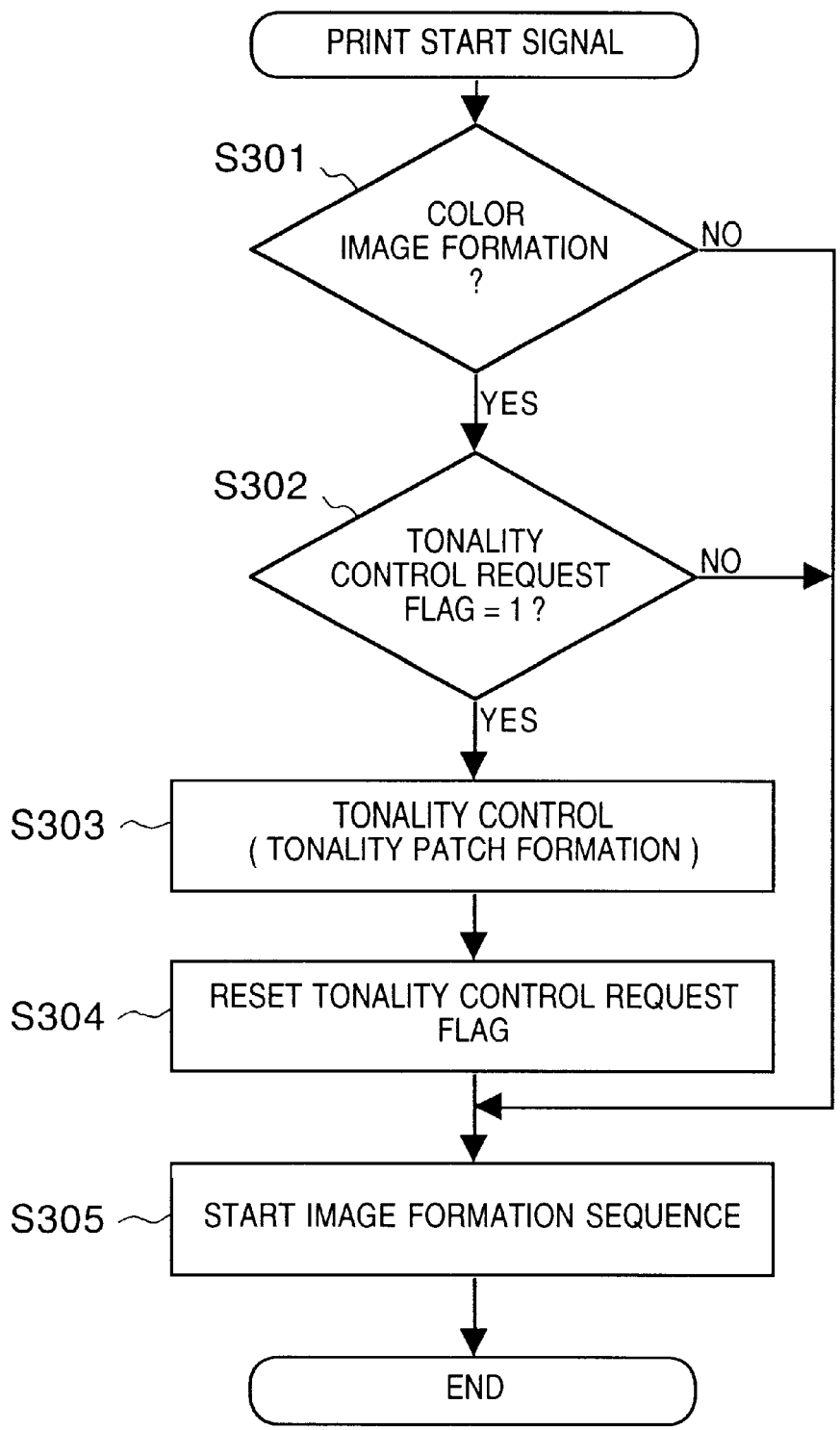
FIG. 4 is a flowchart showing the tonality control according to the first embodiment.

FIG. 4 is a flowchart showing the patch formation control in a case where formation of the tonality patch patterns is controlled in consideration of monochrome image formation.

First, when the copy key or the like is depressed at the operation unit 40 and the print start signal is inputted at arbitrary timing, the CPU 209 receives the signal, and determines whether the print start signal is a color image formation request or monochrome image formation request (step S301). Note that the color/monochrome image formation request may be designated by a user with keys (not shown) at the operation unit 40, or it may be arranged such that prescanning is performed on an original and it is determined whether or not the original is a color original or monochrome original. In a case where image formation is performed based on an image signal inputted from the external device such as a computer via the external input I/F 213, it may be determined whether or not the image signal represents a monochrome image based on header information added to the image signal or by analyzing the image signal.

If the print start signal is a color image formation request, the tonality control request flag on the RAM 211 is determined (step S302). If the value of the flag is "1", the tonality control is performed (step S303). Then the tonality control request flag is reset (step S304) and the image formation sequence is performed (step S305).

On the other hand, if it is determined at step S301 that the print start signal is a monochrome image formation request and if it is determined at step S302 that the value of the tonality control request flag is "0", the image formation sequence is performed (S305) without tonality control, and image output is performed.

That is, in the present embodiment, in case of monochrome image formation, even if the tonality control request flag is set, the tonality control is not performed. This avoids increment of the FCOT in monochrome image formation.

Note that in the present embodiment, the tonality control is performed by forming the tonality patches on the intermediate drum 30, however, the tonality control of the present invention is not limited to this arrangement. For example, the tonality patches may be formed on the electrostatic drum 1, or it may be arranged such that the tonality patches are formed on the print sheet P and the densities of the tonality patches are detected by reading the print sheet P. Further, as long as the image formation apparatus has a transfer belt, the tonality patches may be formed on the transfer belt. Otherwise, the tonality patches may be formed in plural positions including the intermediate drum 30 for tonality control. Further, the present invention is applicable to an image formation having a transfer drum which directly holds the transfer sheet P without the intermediate drum 30 and performs transfer, or an image formation apparatus having plural electrostatic drums.

As described above, according to the present embodiment, in an image formation apparatus capable of color/monochrome image formation by an electrophotographic method, tonality control is not performed in monochrome image formation. Thus, increment of FCOT of monochrome image formation can be prevented.

<Second Embodiment>

Next, a second embodiment of the present invention will be described below.

Figure 5:
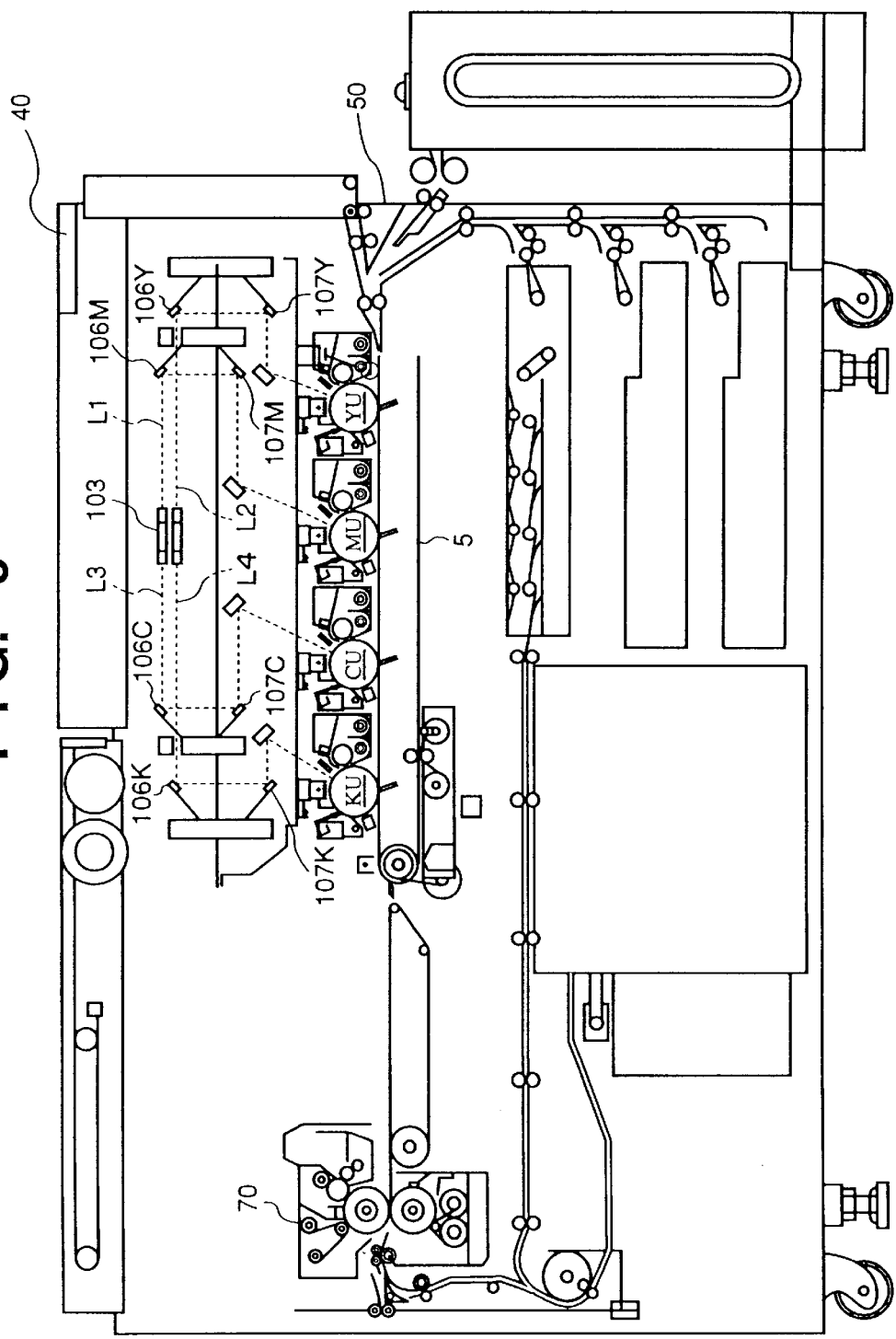
FIG. 5 is a schematic cross sectional view of the image formation apparatus according to a second embodiment of the present invention.

FIG. 5 is a schematic cross sectional view of the image formation apparatus according to the second embodiment. The image formation apparatus has 4 image formation units, YU, MU, CU and KU, for color or monochrome image formation. That is, laser beams (L1 to L4) based on the respective color components of original image read by the reader (not shown) are emitted from the exposure device 103, and scan on electrostatic drums in the image formation unit YU, MU, CU and KU for the respective colors.

Figure 6:
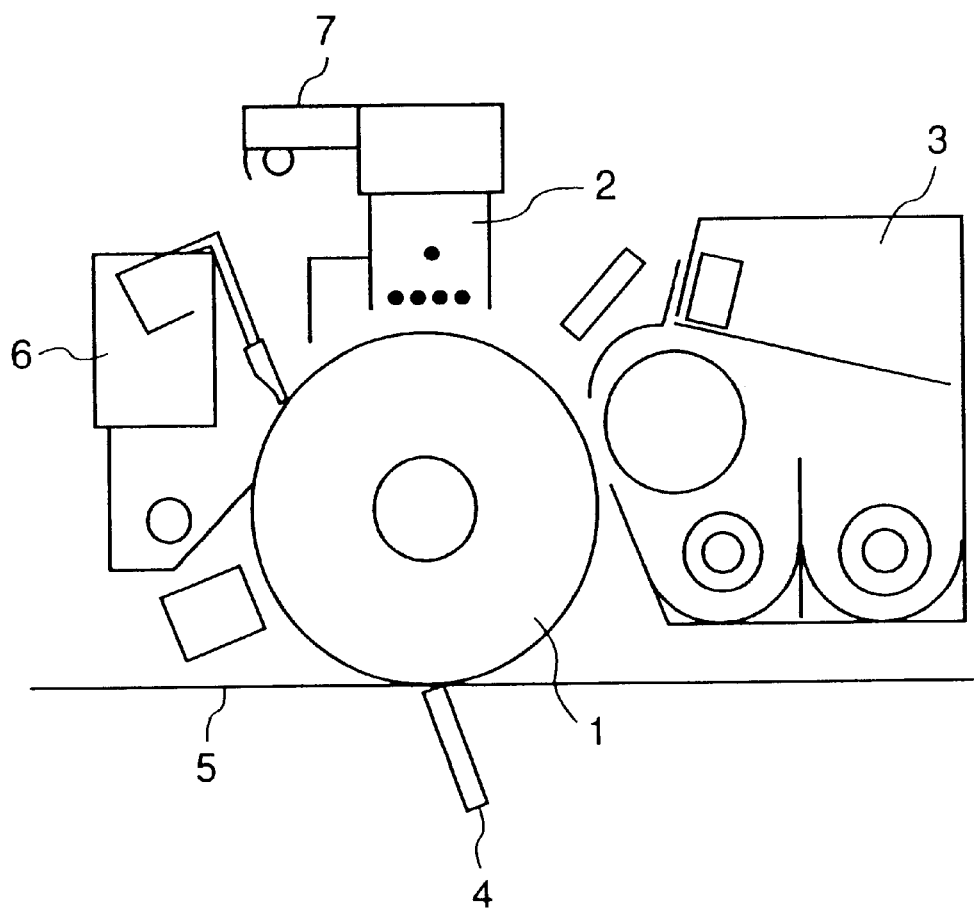
FIG. 6 is a schematic cross sectional view showing the structure of the image formation unit of the second embodiment.

These image formation units YU, MU, CU and KU have a construction as shown in FIG. 6. In FIG. 6, each image formation unit has the rotatably-supported electrostatic drum 1. The primary charger 2, a developer 3, the transfer charger 4, the cleaner 6 and a pre-exposure device 7 are provided around the electrostatic drum 1. The transfer material holding belt 5 as transfer material conveyance means is provided below the electrostatic drum 1. The transfer material holding belt 5 conveys the print sheet P fed from a paper feeder 50 to the position of the transfer charger 4 of each respective image formation unit.

Hereinbelow, the image formation process in the image formation apparatus according to the second embodiment will be described. First, in each image formation unit, the primary charger 2 negatively charges the electrostatic drum 1 uniformly, then the operation of the laser beam exposure device 103 as image exposure means forms an electrostatic latent image corresponding to a color-separated image exposure pattern. The electrostatic latent images are developed with respective yellow (Y), magenta (M), cyan (C) and black (K) toner, thus visualized.

More specifically, each of the developers 3 for the respective colors has a developing sleeve which holds negatively-charged color toner and conveys the toner to a developing area near the electrostatic drum 1. The toner is attached to the electrostatic latent image formed on the electrostatic drum 1 by a developing electric field formed by a developing bias voltage applied to the developing sleeve and a surface potential of the electrostatic drum 1 (negative development). Thus, the electrostatic latent image is visualized as a toner image.

The respective visible images are sequentially transferred onto the print sheet P held on the transfer material holding belt 5 by the operation of the transfer charger 4, and a full color image is formed on the print sheet P. When the image formation has been completed, the print sheet P is removed from the transfer material holding belt 5 and sent to the fixer 70. The transferred toner images of the full color image are fixed onto the print sheet P at once. Thus a desired full color image is obtained.

Then the print sheet P is discharged onto a discharge tray (not shown). In each image formation unit, the cleaner 6 removes residual toner on the electrostatic drum 1, then the pre-exposure device 7 discharges the residual surface potential on the electrostatic drum 1, in preparation for subsequent latent image formation.

In this manner, in the image formation apparatus having the plural image formation units, as images in different colors are sequentially transferred onto the same print sheet P, the transfer image positions in the respective image formation units might shift from an ideal reference position. For example, if such positional shift occurs in color image formation, respective color toner images are overlaid in relatively shifted positions. The positional shift causes difference in tint and further causes color shift, which greatly degrades the image quality.

Figure 7:
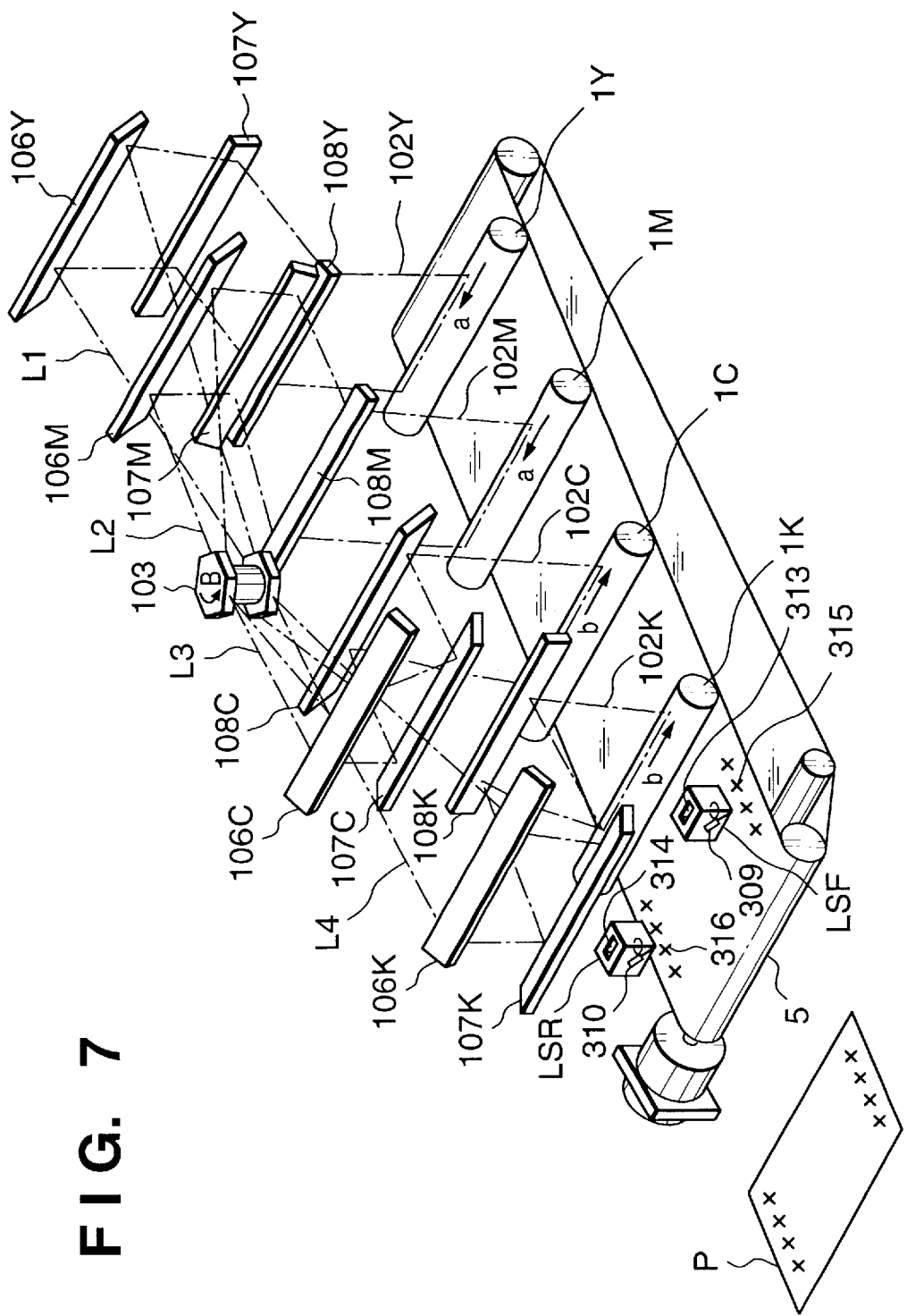
FIG. 7 is a perspective view showing the structure of an image exposure part of the image formation apparatus of the second embodiment.
Figure 8:
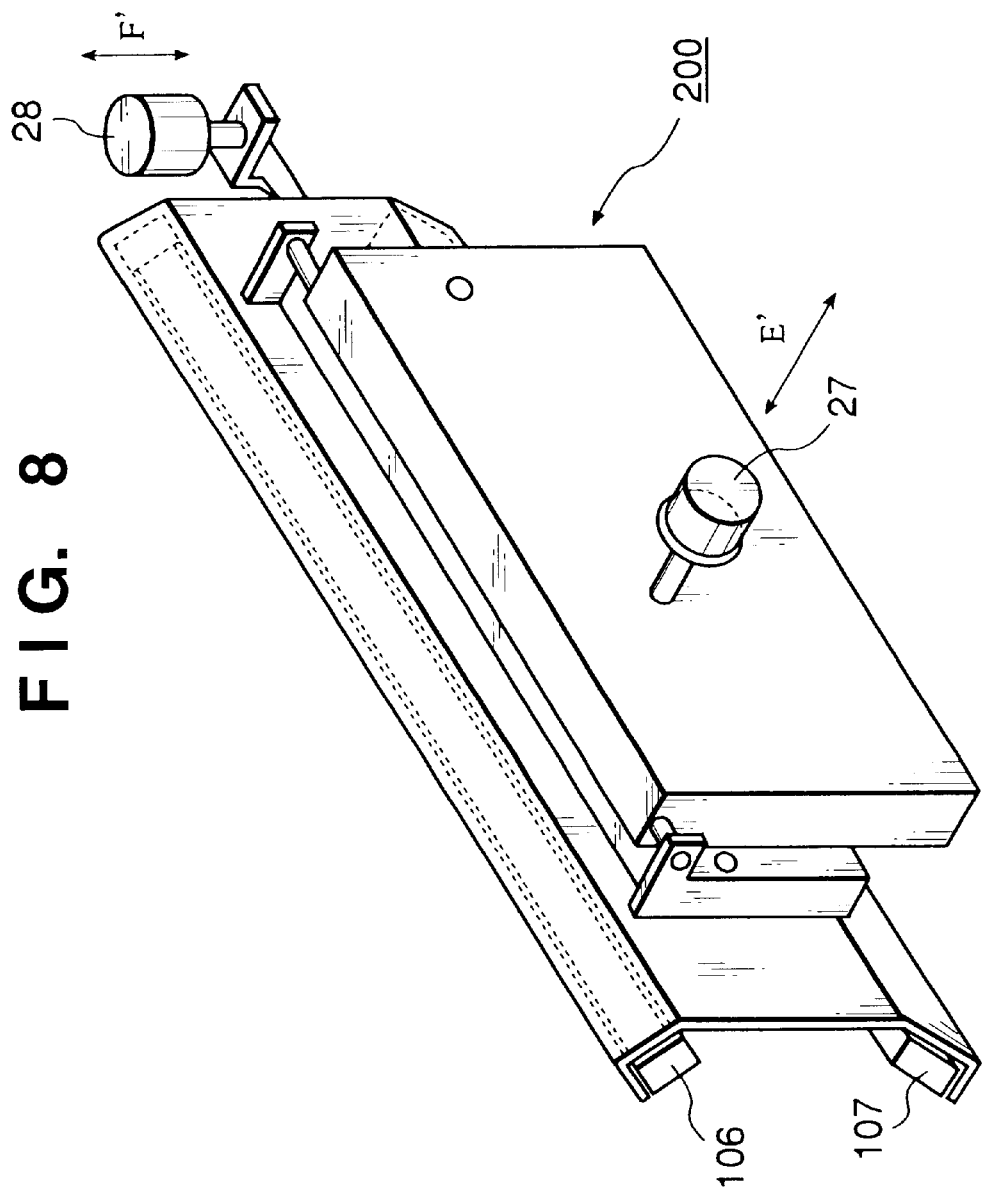
FIG. 8 is a perspective view showing a mechanical registration correction mechanism in the image exposure part of the second embodiment.

It is considered that the above color shift occurs due to the following factors:

a. shift in relative writing start timing in each image formation unit b. shift in attachment angle of optical scanning system c. shift in scanning line length due to difference in optical path length from the optical scanning system to the electrostatic drum in the respective image formation units In the image formation apparatus of the second embodiment, to prevent the occurrence of color shift, so-called registration correction is performed. Next, a construction to perform the registration correction in the image formation apparatus of the second embodiment will be described with reference to FIGS. 7 and 8. FIG. 7 is a perspective view showing the structure of an image exposure part of the image formation apparatus. FIG. 8 is a perspective view showing a mechanical registration correction mechanism in an optical scanning system of the image exposure part.

As shown in FIG. 8, among reflection mirrors provided in the middle of the optical path in each image formation unit, a pair mirror 200, having mirrors 106 and 107 provided with a predetermined distance therebetween and at a predetermined angle, is adjusted in arrows E' and F' directions with respect to the apparatus main body, to correct the shift amount.

That is, by moving the pair mirror 200 in the arrow E' direction, the optical path length of a scanning line 102 can be changed without changing the position of the scanning line 102 image-formed on the electrostatic drum 1. Further, by moving the pair mirror 200 in the arrow F' direction, the position and angle of image formation on the electrostatic drum 1 can be corrected without changing the optical path length of the scanning line 102. Note that the movement of the pair mirror 200 in the arrows E' and F' directions can be made by respectively controlling actuators 27 and 28.

In FIG. 7, numerals 315 and 316 denote registration marks transferred onto the print sheet P or the transfer material holding belt 5. The registration marks are detected by sensors LSF and LSR. The sensors LSF and LSR comprise sensors (CCD sensors) 313 and 314 for reading the registration marks 315 and 316 and optical systems 309 and 310 for guiding images of the registration marks 315 and 316 to the sensors 313 and 314. That is, the amount of current positional shift is calculated based on signals obtained by reading the registration marks 315 and 316 transferred on to the transfer material holding belt 5 by the sensors (CCD sensors) 313 and 314.

Figure 9:
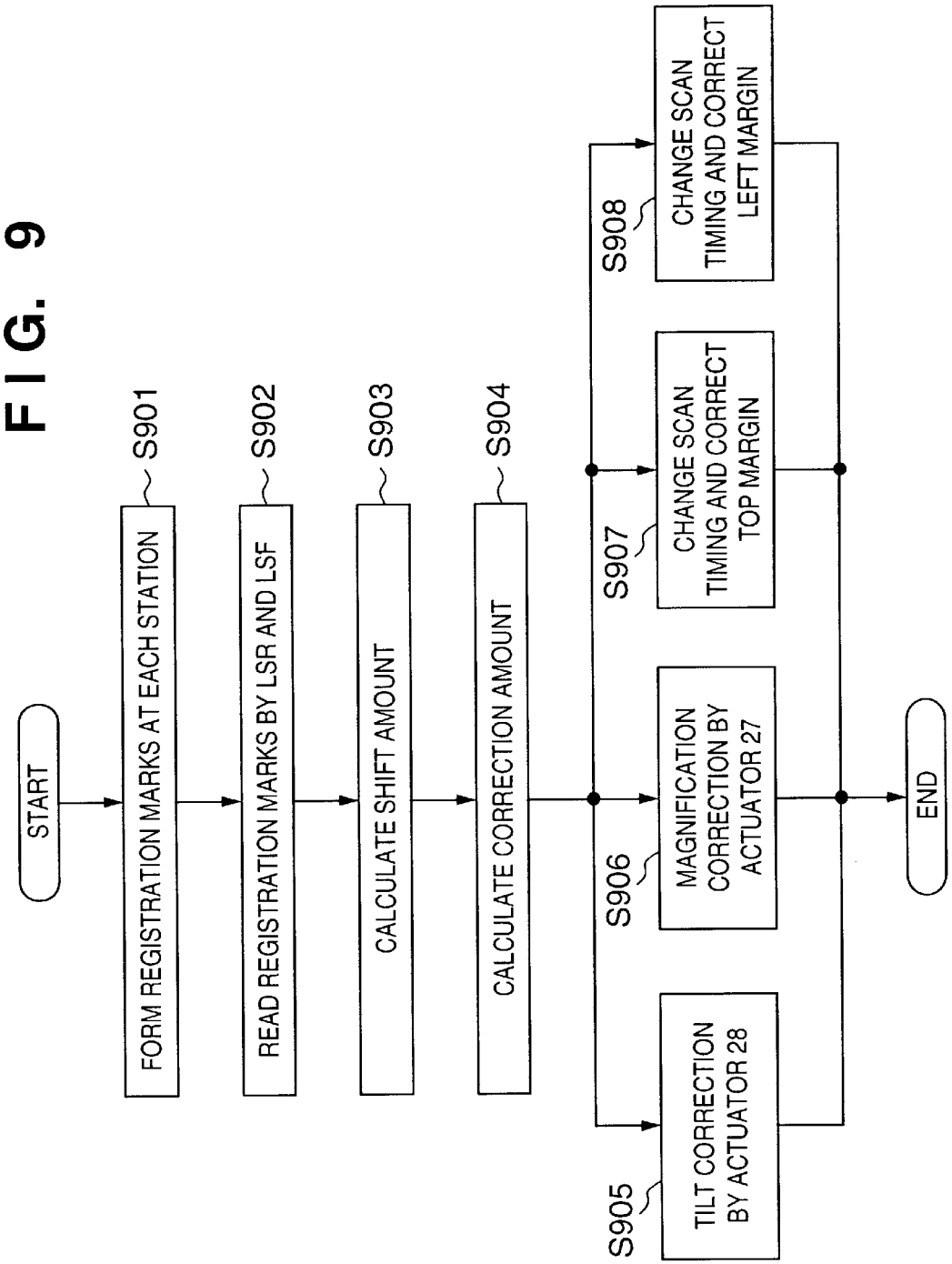
FIG. 9 is a flowchart showing registration correction processing according to the second embodiment.

FIG. 9 is a flowchart showing registration correction processing according to the second embodiment. First, the registration marks 315 and 316 are formed in each image formation unit (step S901). The sensors LSR and LSF read the registration marks 315 and 315 transferred onto the transfer material holding belt 5 (step S902). The amount of positional shift of the image formation unit is calculated based on the read values (step S903), and the amount of registration correction is calculated (step S904). Then, correction is performed based on the amount of registration correction. For example, by correcting tilting shift by using the actuator 28 (step S905), the positional shift due to the above factor b can be corrected. Further, by correcting the magnification shift (shift in optical path length) by using the actuator 27 (step S906), the positional shift due to the above factor c can be corrected.

Further, in addition to the mechanical correction at steps S905 and S906, electrical correction at steps S907 and S908, correction on top margin and left margin by adjusting scanning timing, can correct the positional shift due to the above factor a.

Note that in the present embodiment, if any of the following conditions is satisfied, a registration correction request is issued.

a. when time elapsed since the power-down of the apparatus is 30 minutes; when the elapsed time is 1 hour; thereafter, whenever 1 hour has elapsed b. after restart due to occurrence of so-called jam such as print sheet jam.

Note that in the second embodiment, upon execution of the registration correction, it takes about 30 sec to complete calculation processing, mirror position adjustment and the like.

In the 4-drum image formation apparatus of the second embodiment, monochrome image formation, i.e., the black-and-white copying can be performed. As in the case of color copying, the FCOT (elapsed time from the depression of copy key to the discharge of copy image) in black-and-white copying is about 15 sec in normal operation. Since color shift does not occur in black-and-white copying, registration correction is not required. However, if registration correction is performed even in black-and-white copying based on the above conditions a and b, the FCOT greatly increases.

In the second embodiment, upon depression of the copy key, the execution of registration correction is controlled in accordance with color image formation or monochrome image formation, for maintaining the FCOT in monochrome image formation.

Figure 10:
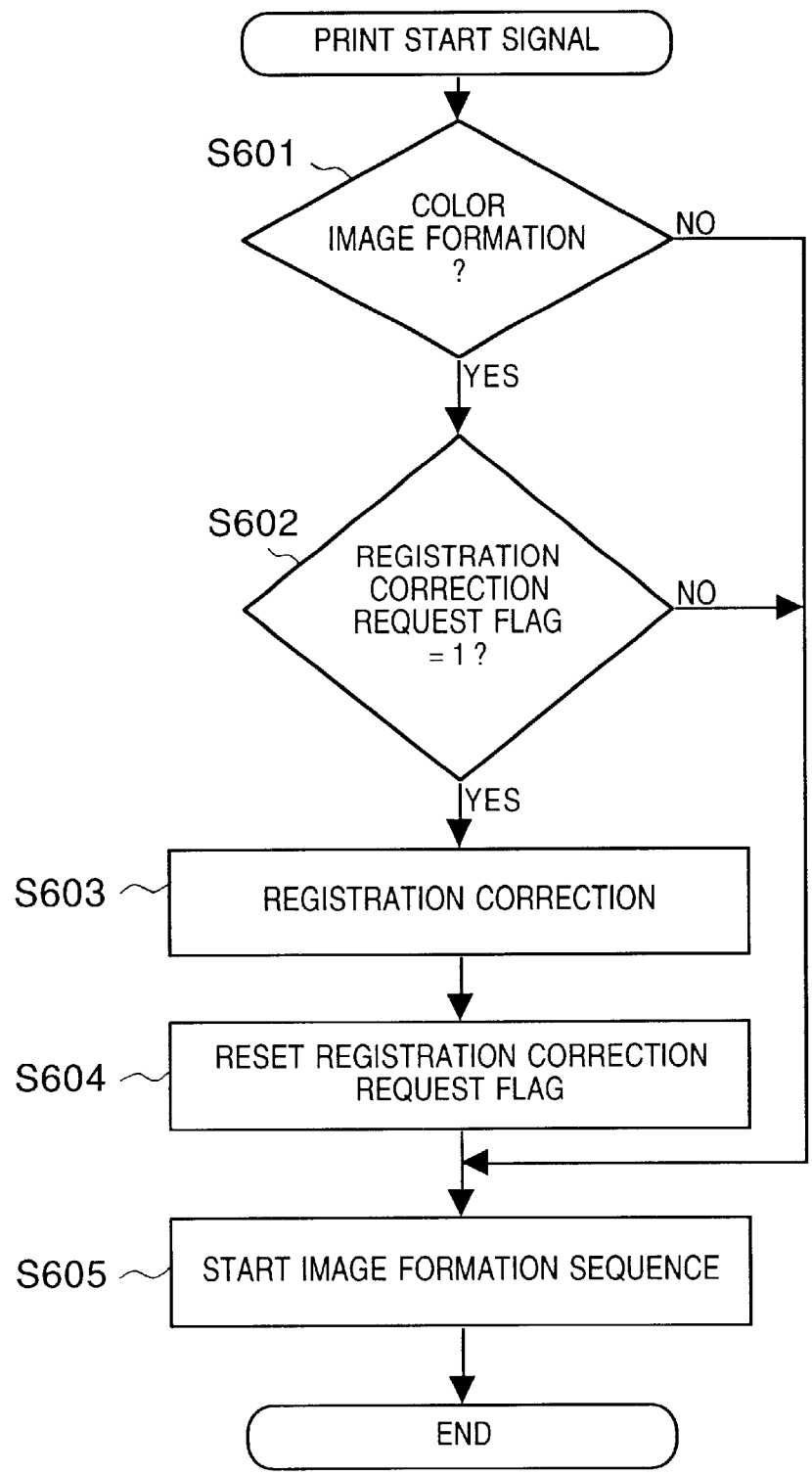
FIG. 10 is a flowchart showing the registration correction execution control according to the second embodiment.

FIG. 10 is a flowchart showing the registration correction control in consideration of monochrome image formation. First, when the copy key or the like is depressed at the operation unit 40 and the print start signal is inputted at arbitrary timing, the CPU (not shown) receives the signal, and determines whether the print start signal is a color image formation request or a monochrome image formation request (step S601). Note that the color/monochrome image formation request may be designated by the user with the keys (not shown) at the operation unit 40, or it may be arranged such that prescanning is performed on an original and it is determined whether or not the original is a color original or monochrome original.

If it is determined at step S601 that the print start signal is a color image formation request, it is determined whether or not a flag (registration correction request flag) is set at a registration correction request address ensured on the RAM (not shown), i.e., the value of the flag is "1" (step S602). If the value of the flag is "1", the CPU issues a registration correction execution request signal, and performs registration correction (step S603). Then the registration correction request flag is reset (step S604), and the image formation sequence is performed (step S605).

On the other hand, if it is determined at step S601 that the print start signal is a monochrome image formation request, and if the value of the registration correction request flag is "0", the image formation sequence is performed (step S605) without execution of the registration correction, and image output is performed.

In the second embodiment, upon formation of a monochrome image, even if the registration correction request flag is set, registration correction is not performed. This avoids increment of the FCOT in monochrome image formation.

Note that in the second embodiment, the registration correction is performed on the transfer material holding belt 5, however, the registration correction control of the present invention is not limited to the above arrangement. For example, the present invention is applicable to registration correction for respective colors in an image formation apparatus having only one image formation unit.

As described above, according to the second embodiment, in an image formation apparatus capable of color/monochrome image formation by an electrophotographic method, registration correction is not performed in monochrome image formation. Thus, increment of the FCOT in monochrome image formation can be prevented.

<Other Embodiments>

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium storing program code for performing the aforesaid processes to a system or an apparatus, reading the program code with a computer (e.g., CPU, MPU) of the system or apparatus from the storage medium, then executing the program.

In this case, the program code read from the storage medium realize the functions according to the embodiments, and the storage medium storing the program code constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides aforesaid functions according to the above embodiments are realized by executing the program code which are read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium are written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

For example, in a case where a printer driver to control a printer has the above-described function, if it is determined that an object print job relates to monochrome (e.g., black-and-white) image formation, the above-described calibration (density correction optimization processing) and registration adjustment (optimization processing on image formation position for each color component) are not performed.

In this case, even if the need for those optimization is notified to the printer driver side from the printer side, the notification is ignored.

Accordingly, it is necessary to authorize the printer driver to permit predetermined apparatus optimization.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus for forming a color image with a plurality of color components comprising:

input means for inputting image data;

image formation means for forming an image based on the image data inputted by said input means;

generation means for generating pattern image data representing a test pattern;

correction means for executing correction processing that controls said image formation means to form the test pattern based on the pattern image data generated by said generation means and corrects image formation conditions related to image density on the basis of measured density of the formed test pattern;

storage means for storing designation data for designating execution of the correction processing by said correction means; and control means for, in a case where formation of a monochrome image based on the image data inputted by said input means is designated, skipping the correction processing regardless of whether or not designation data is stored in said storage means, and, in a case where formation of a color image based on the image data inputted by said input means is designated, determining whether or not to execute the correction processing depending upon whether or not designation data is stored in said storage means.

2. The image forming apparatus according to claim 1, wherein said correction means controls said image formation means to form respective test patterns for the plurality of color components.

3. The image forming apparatus according to claim 1, wherein said correction means corrects image formation conditions related to tones of the image formed by said image formation means.

4. An image forming apparatus for forming a color image with a plurality of color components comprising:

input means for inputting image data;

image formation means for forming an image based on the image data inputted by said input means;

generation means for generating pattern image data representing respective image formation positions for the plurality of color components;

correction means for executing correction processing that controls said image formation means to form a test pattern based on the pattern image data generated by said generation means and corrects image formation conditions related to an image formation position on the basis of detection of the formed test pattern;

storage means for storing designation data for designating execution of the correction processing by said correction means; and control means for, in a case where formation of a monochrome image based on the image data inputted by said input means is designated, skipping the correction processing regardless of whether or not designation data is stored in said storage means, and, in a case where formation of a color image based on the image data inputted by said input means is designated, determining whether or not to execute the correction processing depending upon whether or not designation data is stored in said storage means.

5. The image forming apparatus according to claim 4, wherein said correction means corrects image formation conditions related to image formation positions of respective images of the plurality of color components.

6. The image forming apparatus according to claim 5, wherein said image formation means has a photoreceptor and an optical system for guiding an optical image to form a latent image on said photoreceptor, and said correction means corrects the image formation positions of the respective images of the plurality of color components by adjusting said optical system.

7. A control method of an image forming apparatus for forming a color image with a plurality of color components comprising:

an input step of inputting image data;

an image formation step of forming an image based on the image data inputted in said input step;

a generation step of generating pattern image data representing a test pattern;

a correction processing execution step of executing correction processing that controls to form the test pattern based on the pattern image data generated in said generation step and corrects image formation conditions related to image density on the basis of measured density of the formed test pattern;

a storage step of storing designation data for designating execution of the correction processing; and control step of, in a case where formation of a monochrome image based on the image data inputted in said input step is designated, skipping the correction processing regardless of whether or not designation data is stored in said storage step, and, in a case where formation of a color image based on the image data inputted in said input step is designated, determining whether or not to execute the correction processing depending upon whether or not designation data is stored in said storage step.

8. The control method according to claim 7, wherein, in said correction step, test patterns are formed for the plurality of color components, respectively.

9. The control method according to claim 7, wherein, in said correction processing execution step, the image formation conditions are corrected so that tones of the image formed in said image formation step become proper.

10. A control method of an image forming apparatus for forming a color image with a plurality of color components comprising:

an input step of inputting image data;

an image formation step of forming an image based on the image data inputted in said input step;

a generation step of generating pattern image data representing respective image formation positions for the plurality of color components;

a correction step of executing correction processing that controls to form a test pattern based on the pattern image data generated in said generation step and corrects image formation conditions related to an image formation position on the basis of detection of the formed test pattern;

a storage step of storing designation data for designating execution of the correction processing in said correction step; and control step of, in a case where formation of a monochrome image based on the image data inputted in said input step is designated, skipping the correction processing regardless of whether or not designation data is stored in said storage step, and, in a case where formation of a color image based on the image data inputted in said input step is designated, determining whether or not to execute the correction processing depending upon whether or not designation data is stored in said storage step.

11. The control method according to claim 10, wherein, in said correction step, the image formation conditions are corrected so that image formation positions of respective images of the plurality of color components, match each other.

12. The control method according to claim 11, wherein the image formation apparatus has a photoreceptor and an optical system for guiding an optical image to form a latent image on said photoreceptor, and in said correction step, position of said optical system is adjusted.

13. A computer program product comprising a computer usable medium having computer readable driver program code means embodied in said medium for controlling an image formation apparatus comprising input means for inputting image data, image formation means for forming an image based on the image data inputted by said input means, generation means for generating pattern image data representing a test pattern, correction means for executing correction processing that controls said image formation means to form the test pattern based on the pattern image data generated by said generation means and corrects image formation conditions on the basis of detection of the formed test pattern, and storage means for storing designation data for designating execution of the correction processing by said correction means, said driver program comprising:

an output step of outputting a print job to said image forming apparatus;

a determination step of determining whether or not the print job is related to formation of a monochrome image; and a control step of, in a case where it is determined in said determination step that the print job is related to formation of a monochrome image, controlling said image forming apparatus to skip the correction processing regardless of whether or not designation data is stored in said storage means.

14. An image forming apparatus for forming a color image with a plurality of color components comprising:

input means for inputting image data;

image formation means for forming an image based on the image data inputted by said input means;

determination means for determining whether it is necessary to execute correction processing of correcting image formation conditions in said image formation means on the basis of utilization state or peripheral environment of said image forming apparatus;

correction means for executing the correction processing in a case where it is determined by said determination means that it is necessary to execute the correction processing; and control means for, in a case of forming a monochrome image based on the image data inputted by said input means, skipping the correction processing regardless of determination result by said determination means.

15. The image forming apparatus according to claim 14, wherein said determination means determines that it is necessary to execute the correction processing if a number of formed images exceeds a predetermined number, or if image formation is not performed for more than a predetermined period, or if the peripheral environment has changed equal to or more than a predetermined value.

16. The image forming apparatus according to claim 14, wherein said determination means determines that it is necessary to execute the correction processing if a predetermined period has passed since the image forming apparatus is turned on or if a recording sheet is jammed within the image forming apparatus.

* * * * *